United States Patent [19]

Reith

[11] Patent Number: 4,844,765
[45] Date of Patent: Jul. 4, 1989

[54] METHOD FOR PREPARING TUFTED PILE CARPET AND ADHESIVE THEREFOR

[75] Inventor: Robert A. Reith, Glen Ellyn, Ill.

[73] Assignee: Amoco Corporation, Chicago, Ill.

[21] Appl. No.: 108,115

[22] Filed: Oct. 14, 1987

[51] Int. Cl.$^4$ .......................... B32B 31/06; B32B 31/20
[52] U.S. Cl. ................................ 156/306.6; 156/313; 156/332; 156/334; 428/97
[58] Field of Search ...................... 156/72, 90, 244.11, 156/243, 306.6, 313, 332, 334; 428/97, 95, 96

[56] References Cited

U.S. PATENT DOCUMENTS

| | | | |
|---|---|---|---|
| 3,110,905 | 11/1963 | Rhodes | 139/391 |
| 3,542,612 | 11/1970 | Fox | 156/72 |
| 3,542,613 | 11/1970 | Fox | 156/72 |
| 3,551,231 | 12/1970 | Smedburg | 156/72 |
| 3,583,936 | 6/1971 | Stahl | 524/480 |
| 3,645,948 | 2/1972 | Stahl | 524/488 |
| 3,676,280 | 7/1972 | Sands | 428/97 |
| 3,684,600 | 8/1972 | Smedburg | 156/93 |
| 3,733,226 | 5/1973 | Stoller | 156/72 |
| 3,734,800 | 5/1973 | Ryan | 156/324 |
| 3,734,812 | 5/1973 | Yazawa | 156/177 |
| 3,745,054 | 7/1973 | Smedberg | 428/97 |
| 3,900,361 | 8/1975 | Hoppe | 156/334 |
| 3,911,185 | 10/1975 | Wright | 428/97 |
| 3,914,489 | 10/1975 | Smedberg | 428/97 |
| 3,940,525 | 2/1976 | Ballard | 428/96 |
| 4,012,547 | 3/1977 | Smedberg | |
| 4,191,798 | 3/1980 | Schumacher | 428/95 |
| 4,243,568 | 1/1981 | Brown | 524/562 |
| 4,434,261 | 2/1984 | Brugel | 156/327 |
| 4,508,771 | 4/1985 | Peoples | 156/72 |
| 4,552,794 | 12/1985 | Goss | 428/95 |

OTHER PUBLICATIONS

"Ethylene Copolymer Based Hot Melt Adhesives"; Handbk. of Adhesives Skeist; pp. 495–506, (1977)–2d Ed.

Primary Examiner—George F. Lesmes
Assistant Examiner—J. Davis
Attorney, Agent, or Firm—Stephen L. Hensley; William H. Magidson; Ralph C. Medhurst

[57] ABSTRACT

Lamination of a tufted, primary carpet backing to a secondary backing is conducted using a composite hot melt adhesive in sheet form. The composite adhesive overcomes the unfavorable temperature-viscosity gradient within the carpet structure during the lamination process, yielding tufted pile carpets with good tuft encapsulation, tuft bind strength and delamination strength. Also disclosed are hot melt adhesive compositions suitable for use in sheet form in such a process.

20 Claims, No Drawings

METHOD FOR PREPARING TUFTED PILE CARPET AND ADHESIVE THEREFOR

This invention relates to a method for preparing a tufted pile carpet and adhesives therefor. More particularly, the invention relates to laminating a tufted primary backing and a secondary backing with a composite hot melt adhesive in sheet form and to adhesives suitable for use in sheet form in such a method.

BACKGROUND OF THE INVENTION

Manufacture of tufted pile carpets normally involves tufting a primary backing followed by washing, dying and drying the tufted backing and then subjecting the same to a finishing operation in which a secondary backing is laminated to a backside of the tufted primary backing.

Tufting usually is accomplished by inserting reciprocating needles threaded with yarn into the primary backing to form tufts of yarn. Loopers or hooks, typically working in timed relationship with the needles, are located such that the loopers are positioned just above the needle eye when the needles are at an extreme point in their stroke through the backing fabric. When the needles reach that point, yarn is picked up from the needles by the loopers and held briefly. Loops or tufts of yarn result from passage of the needles back through the primary backing. This process typically is repeated as the loops move away from the loopers due to advancement of the backing through the needling apparatus.

If desired, the loops can be cut to form a cut pile, for example, by using a looper and knife combination in the tufting process to cut the loops. Alternatively, the loops can remain uncut.

Primary backings for tufted pile carpets are typically woven or nonwoven fabrics made of one or more natural or synthetic fibers or yarns, such as jute, wool, polypropylene, polyethylene, polyamides, polyesters, and rayon. Films of synthetic materials, such as polypropylene, polyethylene and ethylene-propylene copolymers also can be used to form the primary backing.

The tufts of yarn inserted in the tufting process are usually held in place by untwisting of the yarn as well as shrinkage of the backing. In the finishing operation, the backside or stitched surface of the backing usually is coated with an adhesive, also commonly referred to as a backcoat, such as a natural or synthetic rubber or resin latex or emulsion or a hot melt adhesive, to enhance locking or anchoring of tufts to the backing. Use of such backcoats also improves dimensional stability of the tufted carpet, resulting in more durable carpets of improved skid and slip resistance.

Generally, the tufted carpet is further stabilized in the finishing operation by laminating a secondary backing, for example a thermoplastic film or a woven or nonwoven fabric made from polypropylene, polyethylene, or ethylene-propylene copolymers or natural fibers such as jute, to the tufted primary backing. The adhesive used in the finishing operation bonds the primary backing to the secondary backing.

In carpet lamination processes, basic requirements for adhesives include ability to bond strongly to the primary backing, the tuft stitches protruding through its backside and the secondary backing. In particular, ability to adhere to nylon and polypropylene is important because the combination of these materials (polypropylene backing fabrics and nylon face yarns) accounts for a large percentage of carpet manufactured at present. Activation temperature of a hot melt adhesive, that is, temperature at which the adhesive softens and flows sufficiently to wet and penetrate the backing surfaces and tuft stitches, must be below the temperature at which the backing and face yarns melt or suffer other damage due to heating, for example, relaxation of oriented polyolefin yarns in the backings. Adhesives also must have low enough viscosities at temperatures employed in finishing to achieve good wetting of the backings and sufficient encapsulation of tuft stitches to make the tuft yarns resistant to pull-out, pilling and fuzzing. In addition, for commercial practice, economics of a carpet manufacturing process utilizing hot melt adhesive must be at least as good as those of conventional latex lamination techniques which remain the dominant lamination process in commercial carpet manufacture.

A number of hot melt adhesives and processes using the same have been proposed for use in carpet lamination. For example, U.S. Pat. No. 3,551,231, issued Dec. 29, 1970 to Smedberg, discloses a hot melt adhesive carpet lamination process in which molten adhesive consisting of an ethylene-vinyl acetate copolymer and, optionally, waxes (e.g. microcrystalline and polyethylene waxes), fillers (e.g. calcium carbonate), resin extenders (e.g., dicyclopentadiene alkylation polymers) and antioxidant is applied to a tufted primary backing and then a secondary backing is contacted with the so-applied, molten adhesive under pressure after which the assembly is cooled to solidify the adhesive. U.S. Pat. No. 3,583,936, issued June 8, 1971 to Stahl, discloses hot melt adhesives for tufted carpet lamination comprising about 10–35 weight percent ethylene copolymer having about 60–85 weight percent ethylene units and about 40–15 weight percent lower vinyl ester, acrylate or methacrylate units; about 10–25 weight percent wax, such as microcrystalline, petroleum, polyolefin, or paraffin wax, having a melting point sufficient to give an adhesive composition with a softening point greater than 190° F.; and about 50–70 weight percent resin extender composed of a base resin prepared from reactive olefins and diene monomers of 5–7 carbons and substantially free of polymerized aromatics and a modifying resin of certain low molecular weight dicyclopentadiene alkylation polymers. Optionally, such adhesives also include fillers, antioxidants, pigments and plasticizers. U.S. Pat. No. 3,900,361, issued Aug. 19, 1975 to Hoppe et al., discloses fusion coating masses suitable for use in carpet backing lamination in which an atactic homo- or copolymer of butene-1 is used to impart flexibility to adhesives comprising a natural or synthetic resin or wax, plasticizer, filler, elastomer and stabilizers.

As disclosed in such patents, an adhesive in molten form is applied to a backing material. Another backing material is brought into contact with the adhesive under pressure, melting and subsequent cooling of the adhesive serving to bond the backing materials. Application of molten adhesive typically is performed using applicator rolls, such as those used in latex lamination processes, that pass through a bath of molten adhesive or by extrusion of molten adhesive onto a backing. The large, heated vessels or extruders required for handling and application of hot melt adhesives in molten form are not needed in latex lamination processes; accordingly, conversion of conventional latex processes to use of hot melt adhesives in molten form can require substantial capital investment.

As an alternative to carpet lamination processes in which hot melt adhesives are applied in molten form, U.S. Pat. No. 3,734,800, issued May 22, 1973 to Ryan, discloses forming hot melt polymers or other thermoplastics into continuous sheet or film and directing the same between primary and secondary backings, heating the backings and adhesive in contact to melt the adhesive and then solidifying the adhesive to form a high strength laminate. According to the patent, advantages of the process reside in elimination of the need for liquids in the lamination process and ability to utilize existing latex lamination ovens for melting the adhesive.

Use of adhesive films to laminate unwoven tapes for other applications also is known from U.S. Pat. No. 3,734,812, issued May 22, 1973 to Yazawa, disclosing use of thermoplastic films, such as low density polyethylene of low molecular weight, ethylene-vinyl acetate copolymer, ethylene acrylamide copolymer and polypropylene, to laminate stretched, unwoven tapes of polymeric materials to form perforated structures useful for protecting agricultural products from animals, birds and insects, for fishing, as a curtain or upholstery material or a bag for vegetables, cereals or powders.

U.S. Pat. No. 3,940,525, issued Feb. 24, 1976 to Ballard, discloses use of thermoplastic films, such as polyethylene, polypropylene or ethylene-vinyl acetate copolymer films, as secondary backings in carpet lamination, the films being laminated to tufted primary backings with hot melt adhesive applied in molten form.

U.S. Pat. No. 4,434,261, issued Feb. 28, 1984 to Brugel et al., discloses extrudable, self-supporting hot melt adhesive sheets containing ethylene-vinyl acetate or other ethylene copolymers, certain plasticizers, fillers and other additives for use in laminating materials such as spun bonded polyester and polypropylene. Use in carpet manufacture is not disclosed.

Another problem with hot melt adhesive carpet lamination methods has been ineffective distribution of adhesive into the secondary backing, rather than into face yarn tuft stitches on the underside of the primary backing. This occurs because the secondary backing generally heats more rapidly than the primary backing and tuft stitches during the lamination process either as a result of direct contact between the secondary backing and the heat source or heated surfaces in the process or the thermal insulating effect of the tufts on the primary backing or a combination of these factors. In turn, the hot melt adhesive activates more rapidly in the vicinity of the secondary backing such that the adhesive tends to flow toward that backing in preference to the primary backing. This preferential flow toward the secondary backing may be enhanced when that backing is more porous than the primary backing, for example when the primary backing is tightly woven or has a high density of tuft stitches and the secondary backing is loosely woven. Such a distribution of the hot melt adhesive results in incomplete tuft encapsulation which, in turn, results in poor carpet wear characteristics. Delamination strength and tuft bind strength also are sacrificed and adhesive is effectively wasted due to ineffective distribution of adhesive within the structure.

From U.S. Pat. No. 3,684,600, issued Aug. 15, 1972 to Smedberg, it is known to apply a low viscosity precoat composition in molten or solution form to a primary backing prior to backcoating with hot melt adhesive. The precoat is used in an amount sufficient to bond the tuft stitch fibers, thereby enhancing bonding of the primary and secondary backings and yielding fuzz-resistant carpets. A variety of precoat adhesives is disclosed including, for example, polyethylene, polypropylene, polybutene, polystyrene, polyesters and ethylene-vinyl acetate copolymers. A precoat blend of ethylene-vinyl acetate copolymer with waxes and a resin mixture of polyethylene, microcrystalline wax, alkyl aromatic thermoplastic resin and unsaturated aliphatic thermoplastic resin also is disclosed. U.S. Pat. No. 4,552,794, issued Nov. 12, 1985 to Goss, also discloses precoat compositions for use in carpet lamination. According to that patent, an improved precoat composition has a Brookfield viscosity of about 25 to about 500 centipoise at about 150° C. and comprises, by weight, about 1 percent to about 19 percent low density polyethylene; about 0.1 percent to about 5 percent of a nitrogen-containing silane cross-linking compound; about 65 percent to about 85 percent of a resin; about 5 percent to about 7 percent of a hydrocarbon wax; and, optionally, up to about 30 percent of a naphthenic oil. Application of precoat in molten form is disclosed.

While precoat hot melt adhesives have been proposed to improve tuft stitch encapsulation, application thereof in molten form creates additional expense and complexity in the lamination process by requiring additional materials, process steps and equipment.

Thus, there remains a need for a hot melt adhesive carpet lamination process that will provide tufted carpets of good bond strength between primary and secondary backings as well as good tuft stitch encapsulation and tuft bind strength that can be practiced without substantial alteration of equipment used in conventional latex lamination processes.

It is an object of this invention to provide an improved hot melt carpet lamination process and adhesives therefor. A further object of the invention is to provide a hot melt adhesive carpet lamination process in which use of molten adhesives and equipment for application thereof is eliminated. A further object is to provide composite hot melt adhesives for such a process and components of such composite adhesives.

I have now found that these objects can be achieved through the use in carpet lamination of composite hot melt adhesive in sheet form comprising layers of adhesive compositions to overcome the unfavorable temperature-viscosity gradient that exists in the carpet structure during the lamination operation. A lower viscosity, resin-rich adhesive in sheet form is applied on the stitched side of a tufted primary backing to promote good tuft encapsulation and tuft-bind strength. A higher viscosity, filler-rich barrier sheet adhesive is placed next to the secondary backing to prevent bleedthrough of the lower viscosity adhesive into the secondary backing during the lamination process. By applying the composite adhesive in sheet form, use of liquids and equipment required for application of adhesives in molten form is eliminated.

DESCRIPTION OF THE INVENTION

Briefly, this invention provides a method for preparing a tufted pile carpet comprising laminating a tufted primary backing to a secondary backing with a composite hot melt adhesive in sheet form comprising a primary layer in contact with a stitched surface of the primary backing and a secondary layer in contact with a surface of the secondary backing, the primary layer comprising a first hot melt adhesive composition and the secondary layer comprising a second hot melt adhesive composition, the first adhesive composition having a viscosity, at a temperature effective to activate the composite hot melt adhesive without damaging the tufted primary backing or secondary backing, that is lower than the viscosity of the second adhesive composition at said temperature.

The composite hot melt adhesive can be provided in the form of separate sheets or a composite sheet, as desired, and inserted between the tufted primary backing and secondary backing as the same are directed into contact in a zone that is heated to a temperature effective to activate the adhesive without damaging the backing materials or tuft yarns, with application of pressure effective to promote flow of the activated adhesive into and around the fibers or yarns of the backings and tuft stitches. In the alternative, composite adhesive in the form of separate sheets of first and second adhesive compositions can be bonded to the appropriate surfaces of the corresponding backings prior to being brought together in the lamination process or a composite sheet comprising primary and secondary layers of first and second adhesive compositions, respectively, can be bonded to the appropriate surface of one of the backings and then the other backing laminated thereto.

According to a further embodiment of the invention there are provided hot melt adhesive compositions suitable for use in sheet form in such a carpet lamination process.

In greater detail, the invented method can employ any suitable primary and secondary backings. As described above, primary and secondary backings woven from natural and synthetic materials, such as jute, wool, rayon, polyamides, polyesters and polyolefins are commonly employed in carpet manufacture. Nonwoven fabrics also can be employed as can films or sheets of thermoplastic materials. If desired, a primary backing having a woven fabric and a nonwoven fabric affixed thereto, for example by needle punching fibers of the nonwoven fabric into the primary backing, also can be employed.

A preferred primary backing is a polyolefin fabric woven from yarns of substantially rectangular cross-section, e.g., slit film yarns, in a square or rectangular weave to form a flat fabric of essentially uniform thickness. The uniform thickness of the backing and substantially rectangular cross-section of the backing yarns facilitates tufting of the backing because friction during needle penetration is reduced and arcuate yarn surfaces capable of deflecting the tufting needles are absent. One such backing having yarns of substantially rectangular cross-section in a one-to-one weave is disclosed in U.S. Pat. No. 3,110,905, issued Nov. 19, 1963 to Rhodes, which is incorporated herein by reference. Most preferably, a polypropylene fabric woven from yarns of substantially rectangular cross-section is used.

Prior to use in the invented process, such primary backings are tufted, usually by needling, to provide a face surface with outwardly projecting tufts and a back surface with tuft stitches, as described above. Tuft yarns, also known as face yarns, can comprise nylons or other polyamides, polyester, polyolefin, acrylic polymers or other natural or synthetic materials as is known in the art. Face yarns can be twisted, provided with a false twist or bulked, all as known in the art. Face yarn or tuft density, that is, number of tuft stitches per unit area, face yarn weight and denier, and pile height vary depending on carpet style as is known in the art.

A preferred secondary backing is a woven polypropylene backing having yarns of substantially rectangular cross-section in the warp and weft or in the warp with spun weft yarns. Secondary backing characteristics also vary with carpet style as is known.

Either or both of the backing fabrics as well as the face yarns may have special characteristics imparted thereto by incorporation therein or application thereto of various dyes, additives, modifiers or surface treatments to improve resistance to flame or stains, reduce static charge, impart color and for other purposes.

The composite hot melt adhesive employed according to the invented process is used in sheet form and comprises first and second layers, which may be joined or separate, comprising first and second adhesive compositions, respectively, that can be activated at temperatures below those at which the primary and secondary backings and face yarns melt or suffer other damage and that exhibit viscosities at such temperatures effective to overcome the unfavorable temperature-viscosity gradient of the adhesive within the carpet structure during finishing. Viscosity of the first adhesive composition at such temperatures is sufficiently low that the activated adhesive flows during the finishing step into and around the tuft stitches and the primary backing so that on solidification of the adhesive the tufts are securely bonded in the carpet structure and resist pull-out. Viscosity of the second adhesive composition at such temperatures is high enough to retard flow of the activated first adhesive composition away from the stitched surface of the primary backing and into the secondary backing but low enough to flow readily on the surface of the secondary backing and around the lower portions of the tuft stitches during the finishing operation and thereby contribute to good bond strength and delamination resistance of the carpet structure after solidification of the adhesive.

A variety of hot melt adhesive formulations can be employed as first and second adhesive compositions according to the present invention. Specific formulations for such compositions as well as application rates thereof may vary depending on carpet style and materials of construction and capabilities of existing lamination equipment for a given application.

As is known, hot melt adhesives can generally comprise a single thermoplastic resin or several different components having multiple and sometimes overlapping functions. Generally, a base or backbone resin controls the cohesive strength and toughness of the adhesive. Modifying or takifying resins can be included to contribute specific substrate wetting and adhesion characteristics and compatibilize other components. Waxes can be used to reduce melt viscosity and blocking and to help control set-up time. Plasticizers also can be used to reduce viscosity and improve flexibility of the adhesive. Antioxidants stabilize the adhesive during compounding and application. Fillers are used to lower costs and increase viscosity.

A preferred adhesive composition suitable for use in sheet or film form in the invented hot melt adhesive carpet lamination process is one comprising about 25 to about 40 weight percent, and more preferably about 30 to about 35 weight percent, low density polyethylene having a melt index of about 15 to about 30 grams per ten minutes and, more preferably, also having a density of about 0.91 to about 0.925 grams per cubic centimeter, as the base resin; about 25 to about 40 weight percent, and more preferably about 30 to about 35 weight percent, synthetic polyterpene modifying resin having a ring and ball softening point of about 90° C. to about 105° C. and number average molecular weight of about 1000 to 1500; about 10 to about 20 weight percent paraffin wax having a melting point of about 140° F. to about 165° F., and more preferably about 150° F. to about 160° F.; about 10 to about 20 weight percent polybutene plasticizer having a viscosity of about 500 to about 5000 centistokes at 210° F., and more preferably about 4000 to about 4500 centistokes at 210° F.; and up to about one weight percent antioxidant which more preferably is a hindered phenol-type antioxidant of low volatility. Such compositions preferably have ring and ball softening points of about 205° F. to about 220° F. and viscosities, determined by capillary techniques, of about 250 to about 100 poise at about 240° F. to about 290° F. Such compositions can be formed into self-supporting sheets or films and are particularly suited for use as a first adhesive composition in the invented process. First adhesive compositions containing at least about 60 weight percent of such a composition and up to about 40 weight percent filler, preferably calcium carbonate, also give good results when used with more highly filled second adhesive compositions according to the invented process Another preferred adhesive composition according to this invention and suitable for use in sheet or film form in a hot melt adhesive carpet lamination process comprises about 30 to about 40 weight percent ethylene-vinyl acetate copolymer containing about 10 to about 35 weight percent vinyl acetate units as base resin; about 30 to about 40 weight percent synthetic polyterpene resin as described above as a modifying resin; about 10 to about 25 weight percent, and more preferably about 15 to about 20 weight percent microcrystalline wax having a melting point of about 175° F. to about 195° F., and more preferably about 180° F. to about 190° F.; about 5 to about 15 weight percent polybutene plasticizer as described above; and up to about two weight percent antioxidant as described above. Such a composition can be formed into a self-supporting sheet or film and is particularly useful as a first adhesive composition according to the invented process when the ethylene-vinyl acetate copolymer base resin has a melt index of about 100 to about 400 grams per ten minutes. First adhesive compositions containing at least about 60 weight percent of such a composition and up to about 40 weight percent filler, preferably calcium carbonate, also give good results when used with more highly filled second adhesive compositions according to the invented process.

A preferred second adhesive composition in the invented method comprises about 25 to about 50 weight percent of the ethylene-vinyl acetate copolymer-based composition as described above in which the ethylene vinyl acetate copolymer has a melt index of about 1 to about 5 grams per ten minutes and about 50 to about 75 weight percent filler. Most preferably such a second adhesive composition contains about 30 to about 40 weight percent of such adhesive composition and about 70 to about 60 weight percent filler.

The preferred filler for such adhesive compositions when used in carpet lamination according to this invention is calcium carbonate. Best results are attained using calcium carbonate having median particle size of about 15 to about 30 microns.

In the invented carpet lamination method, best results are attained when using a composite hot melt adhesive in sheet form in which the first adhesive composition is the low density polyethylene-based or high melt index ethylene-vinyl acetate copolymer-based first adhesive composition as described above and the second adhesive composition is a calcium carbonate-filled, low melt index ethylene-vinyl acetate copolymer-based composition as described above.

The above-described composite adhesives and first and second adhesive compositions are preferred according to this invention because the adhesive compositions are non-blocking and easily fabricated into self-supporting sheets or films and because use thereof in sheet or film form in the invented process yields carpets having good tuft encapsulation, tuft bind strength and delamination strength. Further, activation temperature as well as bonding ability of such adhesive compositions make them well suited for use with polypropylene backings and nylon face yarns. An advantage of such composite adhesives relative to use of the adhesive compositions alone is that delamination and tuft bind strengths of carpets made with the composite adhesive do not change as much over a range of finishing conditions; accordingly, for example, heating time can be increased when using composite hot melt adhesive to ensure complete tuft encapsulation while maintaining good delamination and tuft bind strengths.

While the above described first and second adhesive compositions are preferred according to the invention, other composite hot melt adhesives can be employed and may give beneficial results. First and second adhesive compositions for such composite adhesives can be formulated from a wide range of materials known in the art. Adhesives used in sheet or film form according to the invented process preferably are sufficiently strong, flexible and non-blocking at temperatures that will be encountered during handling and storage to allow self-supporting sheets to be fabricated and taken up on rolls and to prevent layers from sticking together on rolls.

Base resins useful in hot melt adhesives generally comprise thermoplastic resins of low enough melting or softening temperature and viscosity to flow readily at finishing temperatures. Desirably, they also have sufficient adhesive and cohesive strength to give good bonding. In addition to the low density polyethylene and ethylenevinyl acetate copolymer base resins discussed above, base resins for hot melt adhesives can include high density polyethylene, linear low density polyethylene, polypropylene, poly(butene-1), ethylene-ethyl acrylate copolymers and ethylene-acrylic acid copolymers and the like. Generally, base resins make up at least about five weight percent of a hot melt adhesive composition.

Modifying resins used to impart substrate wetting and tackifying properties are generally low melting, low molecular weight resins. Certain polyterpene modifying resins are described above. Other synthetic and naturally occurring resins and rosins can be employed. They can be unmodified or hydrogenated, functionalized or otherwise modified aliphatic, aromatic, or heterocyclic materials. Specific examples include other terpene resins, coumarone-indene resins, terpene-phenolic resins, fusible phenolic resins, petroleum hydrocarbon resins and the like. Generally, modifying resins can constitute up to about 45 weight percent of the adhesive.

Waxes used to reduce melt viscosity and blocking of hot melt adhesives include various polyolefin, paraffin and petroleum waxes. Microcrystalline petroleum waxes are commonly employed. Generally, waxes can make up to about 40 weight percent of a hot melt adhesive.

Plasticizers useful in hot melt adhesive formulations are generally low molecular weight, amorphous materials or oils that reduce viscosity and increase flexibility of the adhesive. Generally, liquids or lower melting solids are used. Examples include low molecular weight polypropenes, polybutenes, polyesters and polyethers, paraffinic, aromatic and naphthenic oils and epoxidized naturally occurring oils. Generally, these materials range up to about 25 weight percent of an adhesive composition.

Various additives also can be included to impart other properties to the adhesives. For example, antioxidants, generally in concentrations up to about two weight percent, can be used to protect against thermal and oxidative degradation during processing. Other stabilizers, flame retardants and colorants also can be used. One or both of the adhesive compositions also may contain a foaming agent capable of releasing a gas at a temperature above the activation temperature of the adhesive but not above the finishing temperature to reduce the amount of adhesive required for finishing.

Fillers, such as calcium carbonate, magnesium carbonate, calcium sulfate, barium sulfate, silica, flyash and various finely divided organic and other inorganic materials or fibers are used to reduce cost and increase viscosity of hot melt adhesives. Filler content of the first and second adhesive compositions used according to this invention can be varied to achieve compositions of desired viscosity for use in the invented process. Preferably, the less viscous, first adhesive composition contains at least bout 50 weight percent hot melt adhesive and up to about 50 weight percent filler and the more viscous, second adhesive composition contains up to about 50 weight percent hot melt adhesive and at least about 50 weight percent filler. Preferably, when using first and second adhesive compositions formulated from identical components and differing only in filler content, the filler content of the second adhesive composition exceeds that of the first adhesive composition by at least bout 20 weight percent.

The adhesive compositions making up the composite hot melt adhesive in sheet or film form that is used in the invented process are formulated and provided in sheet or film form by any suitable technique. Suitably, components of each such composition are formed into a homogeneous fluid or liquid mixture, with any filler to be used dispersed uniformly therein, before forming into sheets or films. Preferably, such a mixture is formed by thoroughly mixing components of the composition except for any filler to be included, heating the mixture while agitating to obtain a homogeneous, molten liquid state and then adding any filler to be used with continued agitation. Any suitable heated, stirred vessel can be used for such mixing, a high intensity mixer, such as a Baker Perkins or a Day type intensive mixer, being preferred for use with compositions containing significant levels of filler.

The resulting mixture can be formed into sheets or films by known techniques such as extrusion or casting. While not preferred, it is possible to mix the components of an adhesive composition in an extruder used for fabrication of sheets. Extrusion or casting of first and second adhesive sheets as separate sheets can be conducted as can formation of a single composite sheet with layers of first and second compositions bonded together, for example by coextruding the first and second compositions through separate extrusion dies and bringing together the extruded sheets while still molten or flowable and cooling the same in contact to fuse the sheets. Thicknesses of the sheets or films of first and second adhesive compositions can be varied, based on densities of the compositions, to thicknesses corresponding to desired application rates in the carpet lamination process.

According to the process of this invention, tufted primary backing and secondary backing are laminated with composite hot melt adhesive in sheet form comprising a primary adhesive layer and a secondary adhesive layer, the laminating being accomplished with the primary adhesive layer in contact with a stitched surface of the primary backing and the secondary adhesive layer in contact with a surface of the secondary backing, the primary and secondary adhesive layers of the adhesive comprising a lower viscosity first adhesive composition and a higher viscosity second adhesive composition, respectively, as discussed hereinabove.

The composite hot melt adhesive, whether in the form of separate sheets or a composite sheet, can be inserted between the backing fabrics as the same are introduced into a heating zone. It also is contemplated to bond a sheet of primary adhesive layer or the primary adhesive layer of a composite hot melt adhesive sheet to the backside of the tufted primary backing, or to bond a sheet of the secondary adhesive layer or the secondary adhesive layer of a composite sheet to a surface of the secondary backing, and then bring such intermediate structures into contact.

Application rates of the composite hot melt adhesive are sufficient to provide good encapsulation and strength without waste of the adhesive or oozing thereof through the primary backing and into the face yarns protruding from the face surface of the backing. Precise application rates can vary considerably depending on carpet style. For carpet styles such as those used in the examples appearing hereinbelow, which are roughly representative of the middle of the spectrum of carpet styles in terms of stitch density, face yarn and backing characteristics, about one-half to about two pounds composite adhesive containing about 40 to about 60 weight percent first adhesive composition and about 60 to about 40 weight percent second adhesive composition is preferably applied per square yard of carpet. With the composite adhesives preferred according to the invention, best results with such carpet types are achieved at application rates of about 0.8 to about 1.3 pounds per square yard. Most preferably about 0.45 to about 0.65 pound per square yard of each of the preferred first and second adhesive composition is applied.

The backings and composite hot melt adhesive are heated in contact to activate the adhesive with application of pressure sufficient to press the backing surfaces into the activated adhesive and cause tuft stitch encapsulation. Heating is at a temperature at least equal to that at which the adhesive compositions of the composite adhesive in sheet form activate but below the temperature at which the backings and face yarns suffer damage, e.g., melting or loss of orientation, due to heating. As is known, ring and ball softening point of an adhesive composition can sometimes be used as an indicator of temperature at which the composition will be activated. With polypropylene backings and face yarns of polypropylene or higher melting yarns such as nylon, heating preferably is at a temperature such that the interior of the carpet structure does not exceed about 300° F. More preferably, interior temperatures during lamination range from about 240° F. to about 290° F.

Pressure is applied to press the backings into the activated adhesive and promote tuft encapsulation but is not so high as to damage the face yarns of the carpet. When heating with a drum laminator, a continuous belt can be used to apply pressure to the contacted backings and adhesives. It also is contemplated to pass the contacted backings and adhesives between pressure or nip rolls while the adhesive is activated to apply the desired pressure. When using such rolls, preferred pressures range from about seven to about twelve pounds per linear inch of carpet.

The resulting structure then is cooled to below the activation temperature of the lowest activating adhesive composition of the composite adhesive to solidify the adhesive compositions and yield a laminate of good delamination resistance and tuft-bind strength.

Any suitable apparatus for conducting such lamination can be employed according to the invention. For example, backings and composite adhesive in sheet form can be supplied from feed rolls to and over a hot drum laminator comprising a heated drum. As noted above, pressure rolls or a continuous belt can be used to apply pressure to the carpet assembly. Typically, the backings contact the drum such that the secondary backing is in contact with the drum, thereby avoiding potential damage to face yarns due to prolonged contact between the same and the heated surface of the drum. Conventional drying and curing ovens of the type used in latex adhesive lamination processes also can be used, the contacted backings and composite adhesive being passed therethrough with a revolving tenter frame or over rolls or other suitable means. As noted hereinabove, a process using conventional latex ovens for lamination with a single hot melt adhesive composition in sheet form is disclosed in the aforementioned U.S. Pat. No. 3,734,800 to Ryan which is incorporated herein by reference. Cooling of the carpet structure can be accomplished by any suitable means, for example by simply passing the carpet structure into an ambient temperature zone or with chill rolls.

The resulting carpet structure can be subjected to post-finishing operations as desired as known in the art.

The following examples are intended to illustrate the invention but should not be viewed as limiting the scope thereof.

EXAMPLES

A series of carpet lamination trials was conducted using various composite hot melt adhesives in sheet form. For comparative purposes, trials also were conducted using various single hot melt adhesive compositions in the form of a single sheet.

GENERAL PROCEDURES

Preparation of hot melt adhesive compositions used in Comparative Examples 5–20, first and second adhesive compositions used in Examples 21–32 and first adhesive compositions in Examples 33 and 34 was accomplished by charging weighed amounts of components to a one-quart metal can equipped with a cylindrical, electric heating mantle, heating while stirring with a three- or four-blade propeller stirrer fitted to a Gast 2AM air-driven motor set at high speed. Heating and stirring were continued for at least one-half hour after the mixtures appeared homogeneous. In general, total heating times ranged from about 45 to about 75 minutes and temperatures did not exceed about 300°–325° F. The commercially available adhesive compositions used in Comparative Examples 1–4 were not blended with other components but simply heated and stirred in the can as described above for about 30 minutes to render them fluid.

The second adhesive compositions used in Examples 33 and 34 were prepared using an AMK Kneader Extruder by charging weighed amounts of base and modifying resins followed by wax, plasticizer and antioxidant to a heating chamber, mixing at maximum speed setting while heating at up to about 300° F. for a time sufficient to yield a homogeneous mixture, generally about one-half hour, adding about one-fourth of the calcium carbonate included in the composition and mixing and heating for about one-quarter hour, adding the remaining calcium carbonate and then mixing and heating for about one hour.

Each adhesive composition except for the second adhesive compositions in Examples 33 and 34 was cast into sheet form by pouring the heated, fluid composition onto a release paper (identified as Daubert Industries Inc. 1-65KG-1FM) and drawing the paper and adhesive through a Barrier Coatings Model 6871 laboratory coater. Sheet thicknesses were adjusted by varying the die gap of the coater. Die gaps ranged from about 15 to 25 mils although actual sheet thicknesses varied from the settings due to presence of bubbles in, and shrinkage of, the films as well as the peaks and valleys that resulted when casting films from filled compositions. The second adhesive compositions used in Examples 33 and 34 were fabricated into sheets using a ¾ inch Brabender extruder fitted with a six inch variable slit die. Die gaps ranged from 5 to 8 mils and extrusion was conducted with a uniform temperature profile of about 105°–120° F. and screw speeds of about 25–50 rpm. The adhesive compositions were extruded into a nip between two polished metal chill rolls, passed around another roll and wound onto a takeup roll. All sheets were cut to five or six inches width by eight inches length prior to use.

In all examples a plain weave polpropylene secondary backing, identified as ACTIONBAC® 3604 and manufactured by Amoco Fabrics and Fibers Company, was used. The backing was woven from 450 denier slit film yarns of 50–60 mils apparent width and about 1.7 mils thickness alternating with slit film yarns of 25–30 mils apparent width and about 1.7 mils thickness in the warp and 1715 denier spun yarns in the weft. The fabric had about 24 warp yarns per inch and about 9 weft yarns per inch.

Tufted primary backings used in the examples were unsized, level loop, nylon pile-tufted materials having a primary backing of woven polypropylene slit film yarns of about 50 mils by 2 mils apparent width and thickness alternating with slit film yarns of about 20–25 mils by about 2 mils apparent width and thickness in the warp and of about 30 mils by 2 mils apparent width and thickness in the weft. The backings had about 20 warp yarns per inch and about 18 weft yarns per inch. The tufted primary backings were obtained from Wellco Carpet Corp., Calhoun, Ga. Two styles were used in the examples. One style, designated "Style A" hereinbelow, had stitch density of eight rows by eight tufts per square inch with a face yarn weight of about 22 ounces per square yard and pile height of about 0.18 inch above the primary backing. The second, designated "Style B" hereinbelow, had stitch density of eight rows by ten tufts per square inch, face yarn weight of about 20 ounces per square yard and pile height of about 0.2 inch above the primary backing.

Carpet lamination trials were conducted by placing hot melt adhesive sheet or sheets between samples of secondary backing and unsized, tufted primary backing, such that length or lengths of the sheet or sheets ran in the warp direction of the backing. In Examples 21-34, a sheet of second adhesive composition was placed on the secondary backing, a sheet of first adhesive composition was placed on the sheet of second adhesive composition and the tufted primary backing was placed on the sheet of first adhesive composition such that the backside or stitched surface of the backing contacted the sheet. Delamination strength test specimens were prepared by placing five inch wide by eight inch long rectangles cut from the adhesive sheets between five inch by nine inch rectangles of tufted primary backing and secondary backing such that a one inch adhesive-free border was left along one of the ends of the specimen to provide tabs for securing samples in the jaws of Instron testing machine. A one-eighth inch thick, aluminum plate, exerting a pressure of about 0.012 lb/in², was placed on top of the layered specimen to keep it flat. The specimen was placed on a six inch by twelve inch by 25 mil carrier plate preheated to the finishing temperature in a Model OV-490A-3 Blue M rapid recovery oven fitted with two, one-eighth inch thick aluminum plates clamped together to form a shelf which provided rapid heat transfer at the finishing temperature. The oven temperature was controlled from a thermocouple inserted in a channel in the center of one of the aluminum plates. After a prescribed dwell time in the oven, the specimen and carrier plate were removed from the oven. The pressure plate was removed and the specimen was run through a set of two and one-fourth inch diameter, unheated nip rolls exerting a pressure of about ten pounds per linear inch of sample length at a rate of about 65 feet per minute. After cooling to room temperature, the specimen was trimmed to eliminate edge effects by cutting one inch strips from the long sides of the specimen, leaving a three inch by nine inch specimen for testing. Tuft bind test specimens six inches wide by eight inches long were prepared in the same manner except that adhesive free tabs and edge trimming were eliminated.

Tuft encapsulation of carpet specimens was evaluated by visually inspecting, with the aid of magnification, face yarns pulled from the primary carpet backings. Secondary backing delamination strength was measured with a Model 1122 Instron machine on three test specimens according to ASTM D-3936-80 and recorded in units of pounds per inch of width of the test specimen. Tuft bind strength was measured in pounds on two test specimens with a minimum of five pulls each according to ASTM D-1335.

COMPARATIVE EXAMPLES 1-20

In these examples carpet laminations were conducted using single sheets of single hot melt adhesive compositions based on commercially available ethylene-vinyl acetate copolymer-based hot melt adhesives identified as 34-2912 and 34-2925, both supplied by National Starch and Chemical Company. Adhesive compositions and properties are shown in TABLE 1 in which 34-2912 is designated "A," 34-2925 is designated "B," ring and ball softening point is abbreviated "SP" and Brookfield viscosity at 350° F. is abbreviated "VIS". Unless otherwise indicated, calcium carbonate ("CaCO$_3$") median particle size was 0.7 micron in Comparative Examples 9, 10, 12 and 17; 2 microns in Comparative Examples 13-16; and 17 microns in Comparative Examples 11 and 18-20. Style A tufted primary backing was used in Comparative Examples 1-13 and 17-20 and Style B was used in Comparative Examples 14-16.

TABLE 1

| EXAMPLE | ADHESIVE COMPOSITION (wt %) | | | | SP (°F.) | VIS (poise) |
|---|---|---|---|---|---|---|
| | A | B | CaCO$_3$ | OTHER | | |
| 1 | 100 | 0 | 0 | 0 | 172 | 12.5 |
| 2 | 100 | 0 | 0 | 0 | 172 | 12.5 |
| 3 | 100 | 0 | 0 | 0 | 172 | 12.5 |
| 4 | 100 | 0 | 0 | 0 | 172 | 12.5 |
| 5 | 75 | 25 | 0 | 0 | ND* | ND |
| 6 | 75 | 25 | 0 | 0 | ND | ND |
| 7 | 50 | 50 | 0 | 0 | ND | ND |
| 8 | 50 | 50 | 0 | 0 | ND | ND |
| 9 | 75 | 0 | 25 | 0 | ND | ND |
| 10 | 37.5 | 12.5 | 50 | 0 | ND | ND |
| 11 | 50 | 0 | 50 | 0 | ND | ND |
| 12 | 50 | 0 | 50 | 0 | ND | ND |
| 13 | 50 | 0 | 50 | 0 | ND | ND |
| 14 | 50 | 0 | 50 | 0 | ND | ND |
| 15 | 50 | 0 | 50 | 0 | ND | ND |
| 16 | 50 | 0 | 50 | 0 | ND | ND |
| 17 | 50 | 0 | 50 | 0 | ND | ND |
| 18 | 33.75 | 11.25 | 50 | 5$^a$ | ND | ND |
| 19 | 33.75 | 11.25 | 50 | 5$^b$ | ND | ND |
| 20 | 33.75 | 11.25 | 50 | 5$^c$ | ND | ND |

*In this and subsequent tables, "ND" stands for not determined
$^a$5 wt. % C4240, a Circosol naphthenic process oil obtained from Sun Petroleum Products Company, was used as a plasticizer.
$^b$5 wt. % Indopol ® H-15, a polybutene obtained from Amoco Chemical Company was used as a plasticizer.
$^c$5 wt. % Indopol ® H-100, a polybutene obtained from Amoco Chemical Company was used as a plasticizer.

Conditions employed in carpet lamination trials with the adhesives of Comparative Examples 1-20, including application rates of the adhesives in sheet form ("APPLN RATE"), finishing temperatures ("OVEN TEMP") and dwell time in the oven ("DWELL TIME") are reported in TABLE 2 as are results of visual observation of completeness of tuft encapsulation ("ENCAPS" -"Yes" indicating complete encapsulation, "No" indicating incomplete encapsulation) and of testing for delamination strength ("DELAM STRENGTH") and tuft bind strength ("TUFT BIND").

TABLE 2

| EX. | FINISHING CONDITIONS | | | TEST RESULTS | | |
|---|---|---|---|---|---|---|
| | APPLN RATE (lb/yd²) | OVEN TEMP (°F.) | DWELL TIME (min) | ENCAPS | DELAM STRENGTH (lb/in) | TUFT BIND (lb) |
| | FHA Minimum Specifications ... | | | | 2.5 | 6.25 |
| 1 | 1.10 | 285 | 2 | Yes | 7.1 | 9.1 |
| 2 | 1.04 | 270 | 1 | No | 12.1 | 8.9 |
| 3 | 0.56 | 270 | 1 | No | >13* | 3.4 |
| 4 | 0.55 | 285 | 2 | No | 6.1* | 1.0 |

TABLE 2-continued

| | FINISHING CONDITIONS | | | TEST RESULTS | | |
|---|---|---|---|---|---|---|
| EX. | APPLN RATE (lb/yd²) | OVEN TEMP (°F.) | DWELL TIME (min) | ENCAPS | DELAM STRENGTH (lb/in) | TUFT BIND (lb) |
| 5 | 1.12 | 270 | 1 | No | 12.8 | 9.5 |
| 6 | 0.58 | 270 | 1 | No | >13* | 5.2 |
| 7 | 1.03 | 270 | 1 | No | 10.6 | 12.5 |
| 8 | 0.54 | 270 | 1 | No | 3.1* | 1.8 |
| 9 | 1.06 | 300 | 4 | No | 0.6 | 3.5 |
| 10 | 1.13 | 285 | 1 | No | 4.8 | 3.3 |
| 11 | 1.06 | 285 | 1 | No | 7.2 | 5.7 |
| 12 | 1.11 | 285 | 1 | No | 5.0 | 5.4 |
| 13 | 1.01 | 300 | 1 | No | 6.0 | 4.8 |
| 14 | 1.06 | 300 | 2 | No | 3.4 | 3.9 |
| 15 | 1.03 | 300 | 3 | No | 2.3 | 2.7 |
| 16 | 1.02 | 300 | 4 | No | 1.7 | 2.4 |
| 17 | 1.54 | 300 | 4 | No | 4.0 | 6.3 |
| 18 | 1.07 | 285 | 1 | No | 7.3* | 3.5 |
| 19 | 1.15 | 285 | 1 | No | 8.7* | 4.0 |
| 20 | 1.03 | 285 | 1 | No | 7.4* | 4.2 |

*Tufts pulled out through the primary backing to varying degrees during delamination testing.

As can be seen from Comparative Examples 1-20 and TABLES 1 and 2, complete tuft encapsulation and delamination and tuft bind strengths exceeding FHA minimum specifications were achieved only in Comparative Example 1 in which unfilled adhesive composition was used at a rate of about one pound per square yard. At lower application rates, shorter dwell times or both, testing results were not as good as in Comparative Example 1, as can be seen from Comparative Examples 2-4. The unfilled adhesive blends in sheet form in Comparative Examples 5 and 7 gave good results in terms of delamination and tuft bind strengths but encapsulation was incomplete; unfilled blends in sheet form in Comparative Examples 6 and 8 tested unfavorably in two of the three categories. In general, alternative formulations using various levels of fillers (Comparative Examples 9-20) performed poorly. Among those, only Comparative Example 17 gave good results in two of the three tests, the other compositions being deficient in two or more of the tests. Thus, from the table, it can be seen that use of a single, filled adhesive composition in sheet form was generally unsatisfactory.

EXAMPLES 21-25

In these examples, composite hot melt adhesives based on the materials used in Comparative Examples 1-20 were used in sheet form, first and second adhesive compositions being designated by "(P)" and "(S)," respectively, to the right of the Example numbers in TABLES 3 and 4. Compositions and properties of the composite adhesives and components thereof, lamination conditions and test results are shown in TABLES 3 and 4, abbreviations used therein being the same as in TABLES 1 and 2. In these examples calcium carbonate median particle size was 0.7 micron in Example 21 and 17 microns in Examples 22-25. Style A tufted primary backing was used in Example 21 and Style B was used in Examples 22-25.

TABLE 3

| | | ADHESIVE COMPOSITION (wt %) | | | SP | VIS |
|---|---|---|---|---|---|---|
| EXAMPLE | A | B | CaCO₃ | OTHER | (°F.) | (poise) |
| 21 (P) | 100 | 0 | 0 | 0 | 172 | 12.5 |
| (S) | 50 | 0 | 50 | 0 | ND | ND |
| 22 (P) | 100 | 0 | 0 | 0 | 172 | 12.5 |
| (S) | 35 | 0 | 65 | 0 | ND | ND |
| 23 (P) | 100 | 0 | 0 | 0 | 172 | 12.5 |
| (S) | 35 | 0 | 65 | 0 | ND | ND |
| 24 (P) | 65 | 0 | 35 | 0 | ND | ND |
| (S) | 35 | 0 | 65 | 0 | ND | ND |
| 25 (P) | 65 | 0 | 35 | 0 | ND | ND |
| (S) | 35 | 0 | 65 | 0 | ND | ND |

TABLE 4

| | FINISHING CONDITIONS | | | TEST RESULTS | | |
|---|---|---|---|---|---|---|
| EX. | APPLN RATE (lb/yd²) | OVEN TEMP (°F.) | DWELL TIME (min) | ENCAPS | DELAM STRENGTH (lb/in) | TUFT BIND (lb) |
| FHA Minimum Specifications . . . | | | | | 2.5 | 6.25 |
| 21 (P) | 0.51 | 300 | 4 | Yes | 2.7 | 4.5 |
| (S) | 0.50 | | | | | |
| 22 (P) | 0.52 | 300 | 2 | No | 5.7 | 7.6 |
| (S) | 0.52 | | | | | |
| 23 (P) | 0.52 | 300 | 4 | Yes | 2.8 | 4.1 |
| (S) | 0.50 | | | | | |
| 24 (P) | 0.52 | 300 | 2 | No | 5.8 | 6.4 |
| (S) | 0.51 | | | | | |
| 25 (P) | 0.52 | 300 | 4 | No | 3.3 | 3.9 |
| (S) | 0.53 | | | | | |

As can be seen from Examples 21-25 and TABLES 3 and 4, in all but one of the examples (Example 25) use of sheets of lower viscosity first adhesive compositions and more highly filled, higher viscosity second adhesive compositions gave favorable results in two of the three categories tested although in no example were results favorable in all three tests. Comparing Example 21 with Comparative Example 9, it can be seen that the composite adhesive in the former and the single adhesive in the comparative example both contained a total of 75 wt % adhesive and 25 wt % filler. Even at a slightly lower application rate and otherwise under identical finishing conditions, use of the composite hot melt adhesive in Example 21 according to the present invention gave improvements in both delamination and tuft bind strengths relative to the comparative example.

EXAMPLES 26-34

These examples illustrate use of composite adhesives in sheet form using first and second adhesive compositions that are preferred according to this invention. Adhesive compositions used in these examples were as follows:

Example 26:

The first adhesive composition consisted of 36 wt % base resin which was an ethylene-vinyl acetate copolymer having a melt index of 388 grams per ten minutes and vinyl acetate content of 28 wt % identified as U.S. Industrial Chemicals Co. UE 653-35; 36 wt % modifying resin which was a synthetic polyterpene resin having a ring and ball softening point of about 98° C. and number average molecular weight of about 1200 identified as Wingtack® 95 from Goodyear Chemical Co.; 18 wt % microcrystalline wax having a melting point of about 185° F. identified as M&M 5185 from Moore and Munger Corp.; 9 wt % high viscosity polybutene plasticizer having a viscosity of 4069-4382 centistokes at 210° F. identified as Indopol® H-1900 Polybutene from Amoco Chemical Company; and 1 wt % hindered phenol antioxidant identified as Irganox 1010 from Ciba-Geigy. The second adhesive composition consisted of 35 wt % of the above described first adhesive composition and 65 wt % calcium carbonate having median particle size of 17 microns.

Examples 27 and 28:

The first adhesive composition was as in Example 26. Composition of the second adhesive composition was the same as that of the second adhesive composition in Example 26 except an ethylene-vinyl acetate copolymer having a melt index of 26 grams per ten minutes and 28 wt % vinyl acetate content, identified as U.S. Industrial Chemicals Co. UE 646-04, was used and a polybutene having a viscosity of 635-690 centistokes at 210° F., identified as Indopol® 300 Polybutene from Amoco Chemical Company, was used.

Examples 29 and 30:

The first adhesive composition was the same as the first adhesive composition in Example 26 except an ethylene-vinyl acetate copolymer having a melt index of 150 grams per ten minutes and vinyl acetate content of 28 wt %, identified as U.S. Industrial Chemicals UE 639-35 was used. The second adhesive composition was as in Examples 27 and 28.

Examples 31 and 32:

The first adhesive composition was the same as the first adhesive composition in Example 26 except an ethylene-vinyl acetate copolymer having a melt index of 150 grams per ten minutes and vinyl acetate content of 18 wt %, identified as U.S. Industrial Chemicals UE 612-04 was used. The second adhesive composition was as in Examples 27-30.

Examples 33 and 34:

The first adhesive composition consisted of 33 wt % low density polyethylene having melt index of 22 grams per ten minutes and density of 0.915 grams per cubic centimeter, identified as U.S. Industrial Chemicals NA 202; 33 wt % synthetic polyterpene resin as described above in connection with Example 26; 16.5 wt % paraffin wax having a melting point of 150°-155° F., identified as Amoco R-50 and obtained from Amoco Oil Company; 16.5 wt % polybutene as described above in connection with Example 26 and one wt % hindered phenol antioxidant as described above in connection with Example 26. The second adhesive composition was the same as the second adhesive composition in Example 26 except the ethylene-vinyl acetate copolymer had a melt index of three grams per ten minutes and vinyl acetate content of 28 wt % and was identified as U.S. Industrial Chemicals UE 645-04.

Finishing conditions in carpet lamination trials and results of testing are reported in TABLE 5. Tests were conducted with Style B tufted primary carpet backings.

TABLE 5

| | | FINISHING CONDITIONS | | | TEST RESULTS | |
|---|---|---|---|---|---|---|
| EX. | | APPLN RATE (lb/yd$^2$) | OVEN TEMP (°F.) | DWELL TIME (min) | ENCAPS | DELAM STRENGTH (lb/in) | TUFT BIND (lb) |
| | | FHA Minimum Specifications... | | | | 2.5 | 6.25 |
| 26 | (P) | 0.49 | 300 | 2 | Yes | 4.2 | 6.1 |
| | (S) | 0.53 | | | | | |
| 27 | (P) | 0.48 | 300 | 2 | Yes | 4.6 | 7.9 |
| | (S) | 0.49 | | | | | |
| 28 | (P) | 0.48 | 300 | 4 | Yes | 3.7 | 7.4 |
| | (S) | 0.48 | | | | | |
| 29 | (P) | 0.50 | 300 | 2 | Yes | 5.9 | 9.2 |
| | (S) | 0.53 | | | | | |
| 30 | (P) | 0.52 | 300 | 4 | Yes | 4.9 | 7.3 |
| | (S) | 0.52 | | | | | |
| 31 | (P) | 0.54 | 300 | 2 | Yes | 6.4 | 9.7 |
| | (S) | 0.52 | | | | | |
| 32 | (P) | 0.51 | 300 | 4 | Yes | 5.2 | 9.2 |
| | (S) | 0.53 | | | | | |
| 33 | (P) | 0.57 | 300 | 2 | Yes | 5.3 | 11.6 |
| | (S) | 0.59 | | | | | |
| 34 | (P) | 0.57 | 300 | 4 | Yes | 5.2 | 11.3 |
| | (S) | 0.59 | | | | | |

As can be seen from Examples 26-34 and TABLE 5, complete tuft encapsulation and delamination and tuft bind strengths exceeding FHA minimums were achieved in all but one example (Example 26), tuft bind strength being only slightly below the minimum specification in that example.

I claim:

1. A method for preparing a tufted pile carpet comprising (A) contacting an unmelted composite hot melt adhesive in sheet form, and comprising a primary adhesive layer bonded to a secondary adhesive layer, with a tufted primary carpet backing and a secondary carpet backing fabric such that a stitched surface of the tufted primary carpet backing contacts the primary adhesive layer and the secondary adhesive layer contacts the secondary backing fabric, wherein the primary adhesive layer comprises a first adhesive composition and the secondary adhesive layer comprises a second adhesive composition, said first adhesive composition having a viscosity, at a temperature effective to activate the first and second adhesive compositions without damaging the tufted primary backing or the secondary carpet backing fabric, that is lower than the viscosity of the second adhesive composition at said temperature; (B) heating the contacted composite hot melt adhesive, tufted primary carpet backing and secondary carpet backing fabric to a temperature effective to activate the first and second adhesive compositions without damaging the backings under pressure effective to press the backings into the activated first and second adhesive compositions, and (C) cooling the activated first and second adhesive compositions in contact with the backings to solidify the first and second adhesive compositions.

2. The method of claim 1 wherein the first adhesive composition comprises about 25 to about 40 weight percent low density polyethylene having a melt index of about 15 to about 30 grams per ten minutes; about 25 to about 40 weight percent of a polyterpene resin having a ring and ball softening point of about 90 to about 105° C.; and about 10 to about 20 weight percent of a paraffin wax having a melting point of about 140° F. to about 165° F.; and about 10 to about 20 weight percent polybutene having a viscosity of about 500 to about 5000 centistokes at 210° F. and up to about 1 weight percent antioxidant.

3. The method of claim 1 wherein the composite hot melt adhesive comprises an ethylene-vinyl acetate copolymer-based adhesive composition comprising about 30 to about 40 weight percent ethylene-vinyl acetate copolymer containing about 10 to about 35 weight percent vinyl acetate; about 30 to about 40 weight percent polyterpene resin having a ring and ball softening point of about 90° C. to about 105° C.; about 10 to about 25 weight percent microcrystalline wax having a melting point of about 175° F. to about 195°; about 5 to about 15 weight percent polybutene having a viscosity of about 500 to about 5000 centistokes at 210° F.; and up to about two weight percent antioxidant.

4. The method of claim 3 wherein the ethylene-vinyl acetate copolymer has a melt index of about 100 to about 400 grams per ten minutes and the first adhesive composition contains about 60 to 100 weight percent of said ethylene-vinyl acetate copolymer-based adhesive composition and up to about 40 weight percent filler.

5. The method of claim 3 wherein the ethylene-vinyl acetate copolymer has a melt index of about 1 to about 5 grams per ten minutes and the second adhesive composition contains about 25 to about 50 weight percent of said ethylene-vinyl acetate copolymer-based adhesive composition and about 75 to about 5 weight percent filler.

6. The method of claim 5 wherein the first adhesive composition comprises about 25 to about 40 weight percent low density polyethylene having a melt index of about 15 to about 30 grams per ten minutes; about 25 to about 40 weight percent of a polyterpene resin having a ring and ball softening point of about 90° C. to about 105° C.; about 10 to about 20 weight percent of a paraffin wax having a melting point of about 140° F. to about 165° F.; about 10 to about 20 weight percent of a polybutene having a viscosity of about 500 to about 5000 centistokes at 210° F.; and up to about one weight percent antioxidant.

7. The method of claim 5 wherein the first adhesive composition comprises (A) about 60 to 100 weight percent of an ethylene-vinyl acetate copolymer-based adhesive composition comprising about 30 to about 40 weight percent ethylene-vinyl acetate copolymer containing about 10 to about 35 weight percent vinyl acetate and having a melt index of about 100 to about 400 grams per ten minutes; about 30 to about 40 weight percent polyterpene resin having a ring and ball softening point of about 90° C. to about 105° C.; about 10 to about 25 weight percent microcrystalline wax having a melting point of about 175° F. to about 195° F.; about 5 to about 15 weight percent polybutene having a viscosity of about 500 to abut 5000 centistokes at 210° F.; and up to about two weight percent antioxidant; and (B) up to about 40 weight percent filler.

8. The method of claim 1 wherein the tufted primary backing comprises a woven polyolefin fabric.

9. The method of claim 1 wherein the tufts comprise yarns of nylon, polyester, polyolefin, acrylic polymer or a combination thereof.

10. The method of claim 1 wherein the secondary backing comprises a woven polypropylene fabric.

11. A method for preparing a tufted pile carpet comprising (A) contacting an unmelted composite hot melt adhesive comprising separate sheets of first and second adhesive compositions with a tufted primary carpet backing and a secondary carpet backing fabric such that a stitched surface or the tufted primary carpet backing contacts a first surface of the sheet of first adhesive composition, the secondary carpet backing fabric contacts a first surface of the sheet of second adhesive composition and a second surface of the sheet of first adhesive composition contacts a second surface of the sheet of second adhesive composition, wherein the first adhesive composition has a viscosity, at a temperature effective to activate the first and second adhesive compositions without damaging the tufted primary backing or the secondary carpet backing fabric, that is lower than the viscosity of the second adhesive composition at said temperature; (B) heating the contacted composite hot melt adhesive, tufted primary carpet backing and secondary carpet backing fabric to a temperature effective to activate the first and second adhesive compositions without damaging the backings under pressure effective to press the backings into the activated first and second adhesive compositions, and (C) cooling the activated first and second adhesive compositions in contact with the backings to solidify the first and second adhesive compositions.

12. The method of claim 11 wherein the first adhesive composition comprises about 25 to about 40 weight percent low density polyethylene having a melt index of about 15 to about 30 grams per ten minutes; about 25 to about 40 weight percent of a polyterpene resin having a ring and ball softening point of about 90° C. to about 105° C.; about 10 to about 20 weight percent of a paraffin wax having a melting point of about 140° F. to about 165° F.; about 10 to about 20 weight percent polybutene having a viscosity of about 500 to about 5000 centistokes at 210° F. and up to about one weight percent antioxidant.

13. The method of claim 11 wherein the composite hot melt adhesive comprises an ethylene-vinyl acetate copolymer-based adhesive composition comprising about 30 to about 40 weight percent ethylene-vinyl acetate copolymer containing about 10 to about 35 weight percent vinyl acetate; about 30 to about 40 weight percent polyterpene resin having a ring and ball softening point of about 90° C. to about 105° C.; about 10 to about 25 weight percent microcrystalline wax having a melting point of about 175° F. to about 195° F.; about 5 to about 15 weight percent polybutene having a viscosity of about 500 to about 5000 centistokes at 210° F.; and up to about two weight percent antioxidant.

14. The method of claim 13 wherein the ethylene-vinyl acetate copolymer has a melt index of about 100 to about 400 grams per ten minutes and the first adhesive composition contains about 60 to 100 weight percent or said ethylene-vinyl acetate copolymer-based adhesive composition and up to about 40 weight percent filler.

15. The method of claim 13 wherein the ethylene-vinyl acetate copolymer has a melt index of about 1 to about 5 grams per ten minutes and the second adhesive composition contains about 25 to about 50 weight percent of said ethylene-vinyl acetate copolymer-based adhesive composition and about 75 to about 50 weight percent filler.

16. The method of claim 15 wherein wherein the first adhesive composition comprises about 25 to about 40 weight percent low density polyethylene having a melt index of about 15 to about 30 grams per ten minutes; about 25 to about 40 weight percent of a polyterpene resin having a ring and ball softening point of about 90° C. to about 105° C.; about 10 to about 20 weight percent paraffin was having a melting point of about 140° F. to about 165° F.; about 10 to about 20 weight percent of a polybutene having a viscosity of about 500 to 5000 centistokes at 210° F.; and up to about one weight percent antioxidant.

17. The method of claim 15 wherein the first adhesive composition comprises (A) about 60 to 100 weight percent of an ethylene-vinyl acetate copolymer-based adhesive composition comprising about 30 to about 40 weight percent ethylene-vinyl acetate copolymer containing about 10 to about 35 weight percent vinyl acetate and having a melt index of about 100 to about 400 grams per ten minutes; about 30 to about 40 weight percent polyterpene resin having a ring and ball softening point of about 90° C. to about 105° C.; about 10 to about 25 weight percent microcrystalline wax having a melting point of about 175° F. to about 195° F.; about 5 to about 15 weight percent polybutene having a viscosity of about 500 to about 5000 centistokes at 210° F.; and up to about two weight percent antioxidant; and (B) up to about 40 weight percent filler.

18. The method of claim 11 wherein the tufted primary backing comprises a woven polyolefin fabric.

19. The method of claim 11 wherein the tufts comprise yarns of nylon, polyester, polyolefin, acrylic polymer or a combination thereof.

20. The method of claim 11 wherein the secondary backing comprises a woven polypropylene fabric.

* * * * *